United States Patent
Lin et al.

(10) Patent No.: US 12,544,320 B2
(45) Date of Patent: Feb. 10, 2026

(54) METHOD FOR SKIN PROTECTION BY USING A ZnO/NSP COMPOSITE

(71) Applicant: POLYAMINE (TAIWAN) CORPORATION, Taipei (TW)

(72) Inventors: Jiang-Jen Lin, Taipei (TW); Huey-Min Lai, Taipei (TW); Mu-Tang Hou, Taipei (TW); Ting-Yueh Hou, Taipei (TW); Chun-Fan Chen, Taipei (TW)

(73) Assignee: POLYAMINE (TAIWAN) CORPORATION, Taipei (TW)

( * ) Notice: Subject to any disclaimer, the term of this patent is extended or adjusted under 35 U.S.C. 154(b) by 334 days.

(21) Appl. No.: 18/477,212

(22) Filed: Sep. 28, 2023

(65) Prior Publication Data
US 2025/0107978 A1   Apr. 3, 2025

(51) Int. Cl.
| | | |
|---|---|---|
| *A61K 8/27* | (2006.01) | |
| *A61K 8/25* | (2006.01) | |
| *A61Q 5/00* | (2006.01) | |
| *A61Q 5/02* | (2006.01) | |
| *A61Q 17/04* | (2006.01) | |

(52) U.S. Cl.
CPC ............... *A61K 8/27* (2013.01); *A61K 8/25* (2013.01); *A61Q 5/006* (2013.01); *A61Q 5/02* (2013.01); *A61Q 17/04* (2013.01); *A61K 2800/74* (2013.01)

(58) Field of Classification Search
None
See application file for complete search history.

(56) References Cited

PUBLICATIONS

Camila O Vieira et al., ZnO:SBA-15 Nanocomposites for Potential Use in Sunscreen: Preparation, Properties, Human Skin Penetration and Toxicity, Skin Pharmacology and Physiology, Oct. 31, 2018, 11 pgs.
Zhao, Dongyuan et al., Triblock Copolymer Syntheses of Mesoporous Silica with Periodic 50 to 300 Angstrom Pores, American Association for the Advancement of Science Jan. 23, 1998, vol. 279, No. 5350, 6 pgs.

*Primary Examiner* — Bennett M Celsa
*Assistant Examiner* — Garen Gotfredson
(74) *Attorney, Agent, or Firm* — MUNCY, GEISSLER, OLDS & LOWE, P.C.

(57) ABSTRACT

A method for skin protection by applying a zinc oxide-on-silicate platelet composite (ZnO/NSP composite) is formulated in a cosmetic composition, to the skin of a subject. The ZnO/NSP composite is made of silicate platelet and ZnO particles adsorbed thereon, in which the ZnO particles are created by the dehydration of $Zn(OH)_2$ formed on the silicate platelet. The ZnO particles adhering on the silicate platelet can effectively improve the dispersibility of zinc oxide particles in water, and the average particle size can reach near nanometer size. Moreover, the ZnO/NSP composite exhibits better antimicrobial and UV light-absorbing properties than ZnO itself, and are not toxic or irritating to the skin.

9 Claims, 10 Drawing Sheets

METHOD FOR SKIN PROTECTION BY USING A ZnO/NSP COMPOSITE

FIELD OF THE INVENTION

The present invention relates to a using method of a ZnO-on-silicate platelet composite (called as ZnO/NSP composite) in skin protection. In particular, the present invention relates to a method for protecting the skin against UV rays and microbial infections by using a ZnO/NSP composite.

BACKGROUND OF THE INVENTION

Zinc oxide is a physical sun blocker that covers the absorption spectrum from 290 to 380 nm and therefore protects against all wavelengths of UVB and UVA. The opaque particles such as minerals in sunscreen products are utilized to directly shield and block sunlight when the sunlight hits these substances. However, the amount of zinc oxide used is relatively high because of the poor dispersion of commercially available zinc oxide, resulting in a sense of heaviness and pallor when applied to skin, which is not favorable to the consumer public. Zinc oxide has also been used to treat and prevent diaper rash and other minor skin problems such as burns, cuts or scrapes. It works by forming a barrier on the skin to keep out irritants or moisture.

In recent years, zinc oxide nanoparticles have been used in many sunscreen products. While the problem of consumer discomfort in application may be solved, the safety of nanoparticles used in sunscreens has been a controversial issue. The previous animal exposure studies have found that the absorption of zinc oxide (ZnO) nanoparticles into the skin is much higher when such sunscreen products applied to the skin. Besides, some public advocacy groups are concerned that sunscreens containing zinc oxide (ZnO) nanoparticles will penetrate the upper layers of the skin and may enter living cells in the epidermis and cause toxicity, including DNA damage.

In prior art, a ZnO-SBA-15 nanocomposite had been developed to use in sunscreen. Santa Barbara Amorphous-15 (SBA-15) is a highly stable mesoporous silica sieve, and is synthesized in acidic conditions using triblock copolymer Pluronic 123 (EO20PO70EO20) as a pattern and tetraethoxysilane (TEOS) for the source of silica. The material is calcined in air at 823 Kelvin for 6 hours to decompose the triblock co-polymer and yielding a white powder, SBA-15. See, Science 23 Jan. 1998:279, 5350, 548-552. In the ZnO-SBA-15 nanocomposite, the ZnO nanoparticles are embedded in the micropores of SBA-15 by a "post-synthesis" process with calcinating at 550° C. for 1 hour.

In present invention, it is firstly found that a ZnO/NSP composite, which is made by forming zinc oxide on the surface of a silicate platelet, makes the formed zinc oxide particles evenly dispersed and adsorbed on the surface of the silicate platelet. The ZnO/NSP composite not only overcomes the shortcoming of the commercially available zinc oxide that is not easy to be dispersed, but also has no toxicity and irritation to human skin. Furthermore, the ZnO/NSP composite may improve the properties of zinc oxide and effectively reduce the amount of zinc oxide used in skin protecting compositions.

SUMMARY OF THE INVENTION

Accordingly, the present invention provides a method for skin protection, which comprises applying a ZnO-on-silicate platelet composite (ZnO/NSP composite) to a subject needed thereof.

In embodiments of the invention, the ZnO/NSP composite is produced by adding an aqueous solution of zinc salt to a silicate platelet suspension for metal ion exchange reaction; using NaOH to form zinc hydroxide on the surface of the silicate platelet; and dehydrating zinc hydroxide to form zinc oxide particles adsorbing on the silicate platelet.

In certain embodiments of the invention, the ZnO/NSP composite is used to protect the skin against UV rays. In other embodiments of the invention, the ZnO/NSP composite is used to protect the skin against microbial infections. In one embodiment of the invention, the microbial comprise pathogenic bacteria. In one embodiment of the invention, the microbial comprise dandruff causing fungi.

In certain embodiments of the invention, the ZnO/NSP composite is formulated in a cosmetic composition at 0.01%~25% (w/w). In one embodiment of the invention, the ZnO/NSP composite is formulated in a sunscreen emulsion composition. In another embodiment of the invention, the ZnO/NSP composite is formulated in an antimicrobial shampoo composition. Yet in another embodiment of the invention, the ZnO/NSP composite is formulated in a hair tonic composition.

DETAILED DESCRIPTION OF THE PREFERRED EMBODIMENTS

In this invention, the "silicate platelet" or "natural silicate platelet (NSP)" refers to an individual sheet structure obtained by complete exfoliation of natural layered clay. The main components of NSP are hydrated and water-dispersible silica-aluminum oxides ($SiO_2 \cdot Al_2O_3 \cdot xH_2O$), with a cation exchange equivalent (CEC) of about 80-200 mequiv/100 g. The preparation method of silicate platelet has been described in many literatures (e.g., U.S. Pat. No. 6,765,050 B2), which mainly comprises placing a natural clay such as montmorillonite, deionized water, surfactants and other raw materials into a reactor tank, and then heating and continuous stirring until the reactions of exfoliation and dispersion are completed to obtain a modified montmorillonite product as grey colloid, which is called silicate platelet or NSP.

The other characteristics and advantages of the present invention will be further illustrated and described in the following examples. The examples described herein are intended for illustrations, not for limitations of the invention.

Example 1. Preparation and Physical/Chemical Characterization of the ZnO-On-Silicate Platelet Composite (ZnO/NSP Composite)

The preparation method of present ZnO-on-silicate platelet composite (ZnO/NSP composite) mainly comprises the following steps: adding an aqueous solution of zinc salt into a suspension of silicate platelet for proceeding a metal ion exchange reaction; adding NaOH to the reaction to form zinc hydroxide on the surface of the silicate platelets; dehydrating the formed zinc hydroxide at 60~99° C. to form zinc oxide particles and adsorbed on the surface of silicate platelets to obtain the liquid formed ZnO/NSP composite; and the liquid ZnO/NSP composite is filtered, dried and milled to obtain the powdered ZnO/NSP composite.

A manufacturing example of ZnO/NSP composite is provided below. The silicate platelets are weighed (0.85 g) and placed in a three-neck round-bottom flask. $ddH_2O$ is added to reach a total weight of about 26 g, and the silicate platelets are stirred at 80° C. for 30 min to homogenize and form a suspension of silicate platelet. A solution of Zinc acetate (41 g, 1% w/w) is added to the three-necked round-bottomed flask, and washed with about 5 mL of $ddH_2O$. The mixture is placed at 80° C. and stirred at 500 rpm for 30 minutes. NaOH solution (22 g, 1% w/w) is added to the flask and washed with about 5 mL of $ddH_2O$. The mixture is reacted at 80° C. for 1 hour, with a stirring rate of 500 rpm, and then left to cool at room temperature. After cooling to room temperature, a ZnO-on-silicate platelet composite (ZnO/NSP composite) is obtained. The product is filtered using an extraction filter. The filter cake is collected and dried at 120° C. until the moisture content was less than 5%. The dried product was finally milled to obtain a powdered ZnO/NSP composite.)

Figure 1:
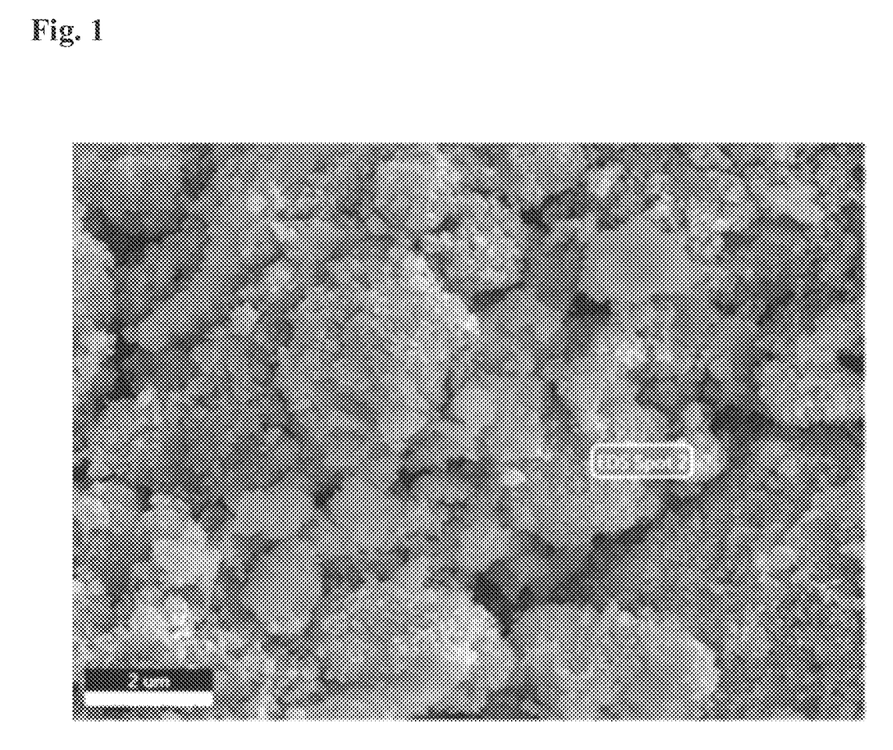
FIG. 1 is a SEM image of the ZnO/NSP composite of the present invention. The length of the marked horizontal line represents 2 μm, and the red circle is the area where ZnO was pulled out for energy scattering X-ray spectroscopy (EDS).

In the observation under SEM (HITACHI SU-5000), the ZnO particles adsorbed on the silicate platelet will aggregate with each other to form a 3D spherical structure. Under the SEM, the whole silicate platelet is full of ZnO, while the silicate platelet is covered underneath. With the laser scattering data, it is also shown that the ZnO particles can stack into larger 3D aggregates (see, FIG. 1).

Figure 2A:
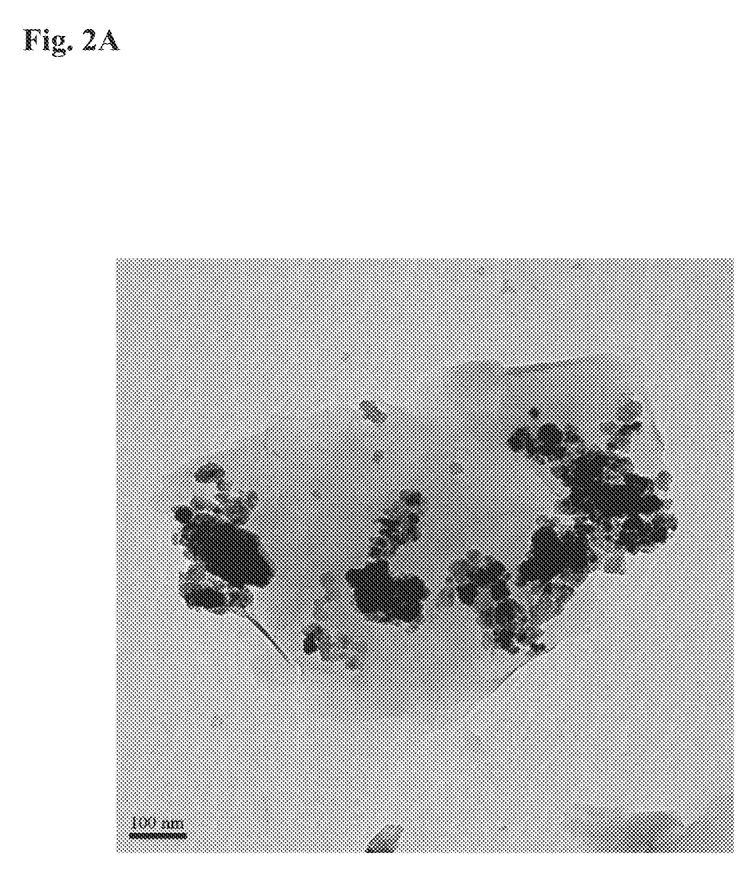
FIG. 2A is the TEM observation image of the ZnO/NSP composite powder after dispersion. The length of the marked horizontal line represents 100 nm.
Figure 2B:
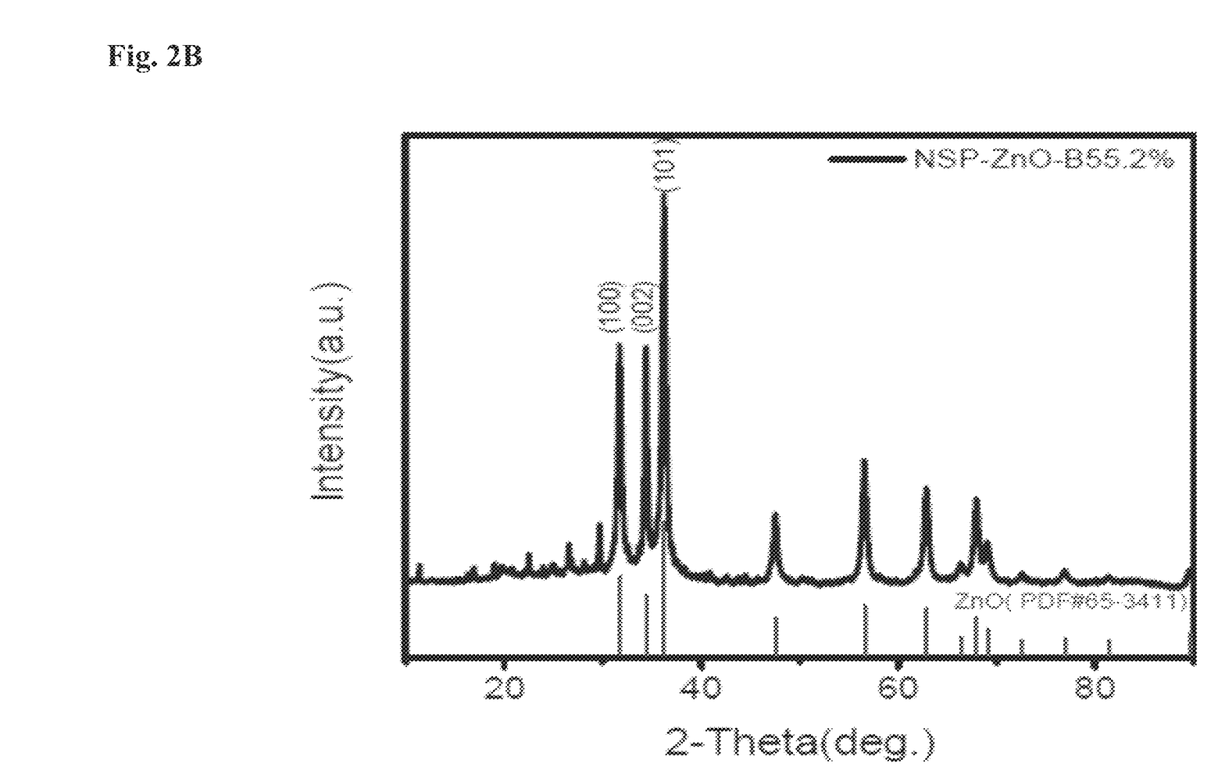
FIG. 2B shows the X-ray diffraction analysis of the ZnO/NSP composite in powder form. The vertical lines present the standard spectrum of ZnO.

For the further examination of the individual particle and stacking patterns of ZnO, the obtained powder ZnO/NSP composites are dispersed and observed by a penetrating electron microscopy (TEM, JEOL JEM-3010) As shown in FIG. 2A, the silicate platelet presents a 2D development with dispersed ZnO particles on its surface, and the particle size distribution of the ZnO/NSP composite is mainly in the range of 1.0 μm to 20.0 μm. The powdered ZnO/NSP composite is then subjected to X-ray Diffraction (XRD) analysis, and the results are shown in FIG. 2B. The average particle size of the ZnO particles is calculated by using the Scherrer equation $$\left(D = \frac{k\lambda}{\beta \cos\theta}\right).$$

The size of each ZnO particle is calculated to be between 15 and 20 nm, which is averaged about 17 nm. In terms of the primary structure of the original lattice, ZnO has a good lattice.

Settling analysis. Different concentrations (100, 200, 300, 500, 1000 ppm) of ZnO or ZnO/NSP composite solutions are prepared using RO water. 5 mL of each solution is pipetted into a test tube and shaken to form a homogeneous white suspension, which is then allowed to stand for a few minutes to observe and record the time of a white precipitate appears at the bottom,

TABLE 1

Settlement of ZnO and ZnO/NSP composite

| Sample | Commercial ZnO | ZnO/NSP | ZnO/NSP | ZnO/NSP | ZnO/NSP | ZnO/NSP |
|---|---|---|---|---|---|---|
| Concentration of ZnO | 100 ppm | 100 ppm | 200 ppm | 300 ppm | 500 ppm | 1000 ppm |
| Observed appearance | White suspension | White suspension | White suspension | White suspension | White suspension | White suspension |
| Time of Precipitate appears * | <1 min. | 150 min. | 15 min. | 15 min. | 15 min. | 5 min. |

* the time when the precipitate starts to appear at the bottom.

Example 2. Toxicity Test of ZnO/NSP Composite on Skin Cells $2 \times 10^5$ cells/mL of three skin cell lines (human normal keratinocytes HaCaT, human fibroblasts Hs68, mouse melanoma cells B16F10) are seeded into 96 well plates and allowed to attach overnight in 37° C. incubator. The cells are incubated with various concentrations (0, 1, 10, 100, 500, 1000, 5000 ppm) of the ZnO/NSP composite solution for 24 hours. Culture medium is removed, and 100 μL of MTT [3-(4,5-dimethylthiazol-2-yl)-2,5-diphenyltetrazolium bromide] solution (1 mg/mL) is added to each well and incubated for 2 hours. MTT solution is removed, and DMSO is added to each well. Absorbance is measured at 595 nm using spectrophotometer.

Figure 3A:
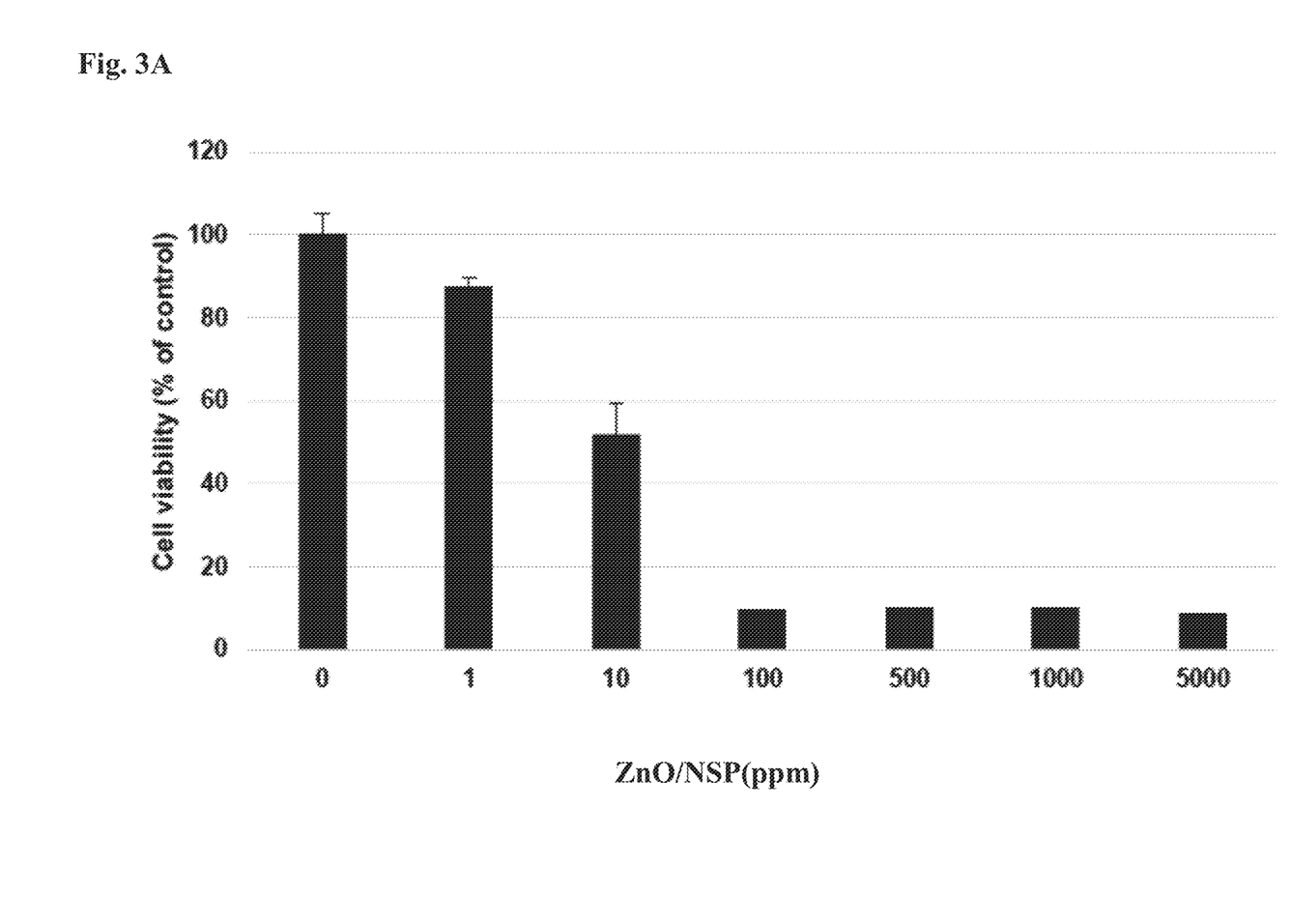
FIG. 3A-3C show the results of the toxicity evaluation of the ZnO/NSP composite on skin cells: human normal keratinocytes HaCaT (FIG. 3A), human fibroblasts Hs68 (FIG. 3B) and mouse melanoma cells B16F10 (FIG. 3C). Cells are incubated with different concentrations (0, 1, 10, 100, 500, 1000, 5000 ppm) of the ZnO/NSP composite solution for 24 hours, and then subjected to MTT analysis to determine the cell viability after treatment with ZnO/NSP composite. The cell viability is expressed as a percentage value of the survival rate in comparison to that of the untreated control group.
Figure 3B:
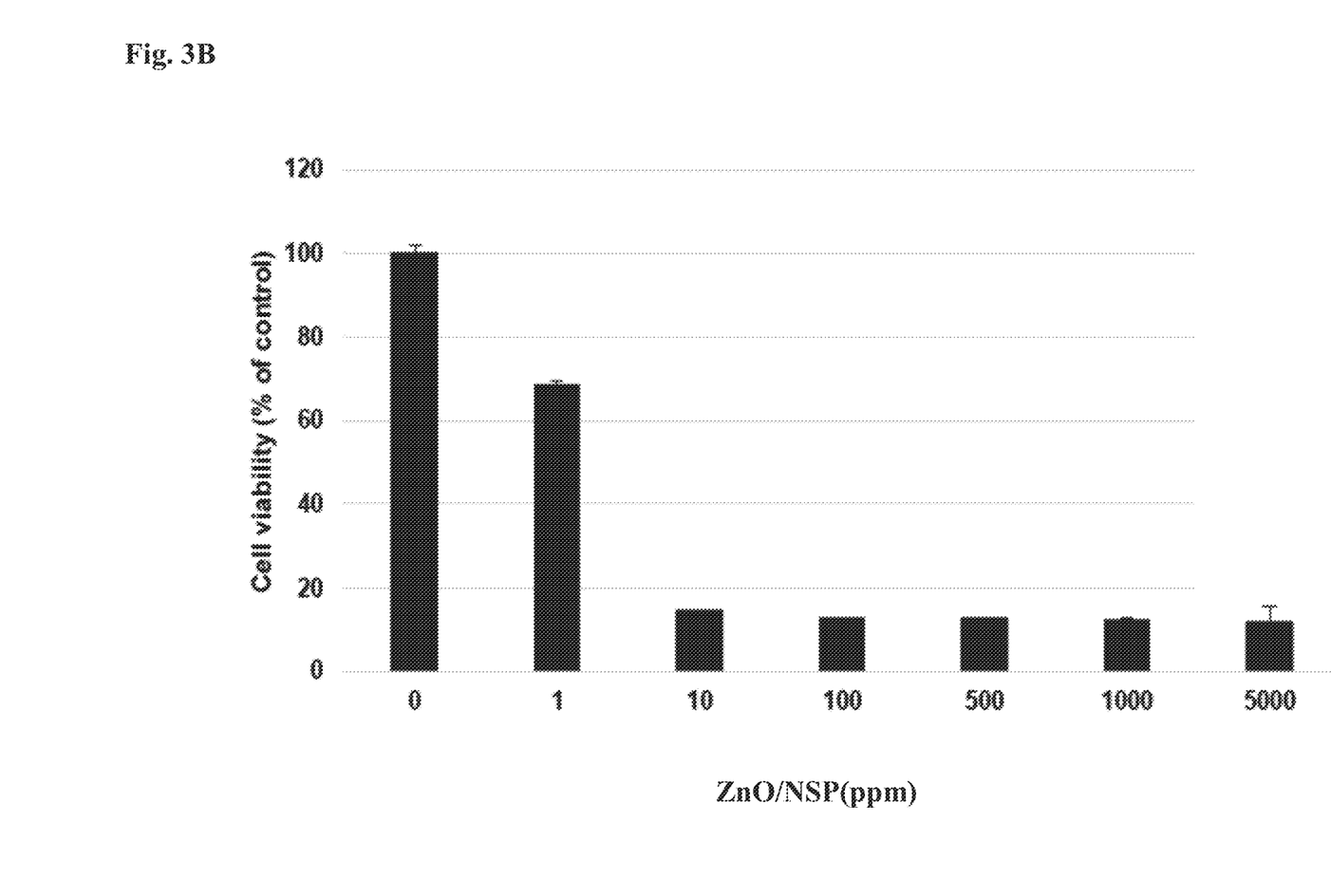
Figure 3C:
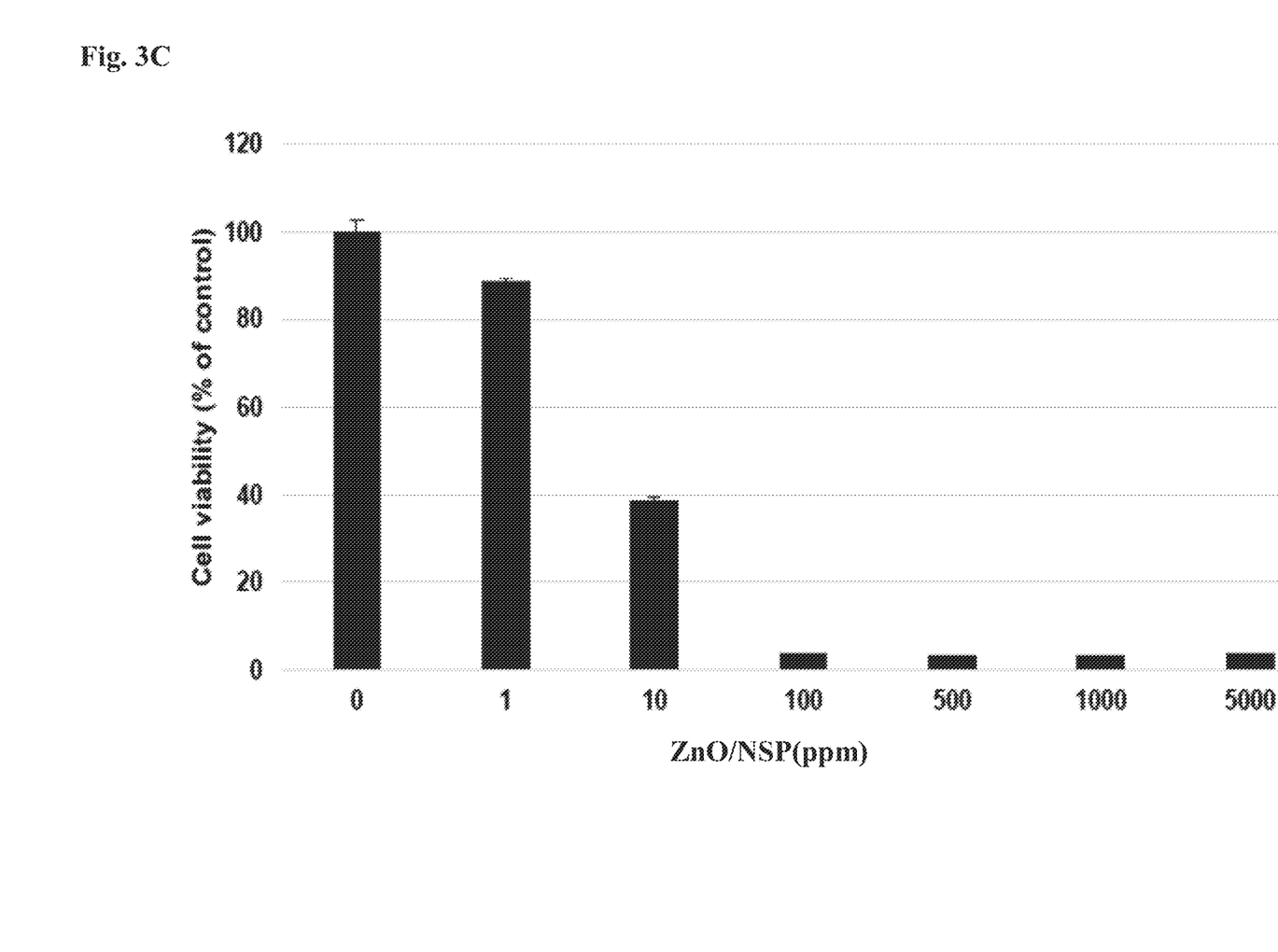

As shown in FIG. 3A-3C, the cell survival rate of human normal keratinocytes HaCaT is 51.78% at a concentration of 10 ppm and 9.49% at a concentration of 100 ppm (FIG. 3A); the cell survival rate of human fibroblasts Hs68 is 68.57% at 1 ppm and 14.47% at 10 ppm (FIG. 3B); and the cell survival rate of mouse melanoma cells is 88.39% at 1 ppm and 38.68% at 10 ppm (FIG. 3C), after 24 hours of interaction with the ZnO/NSP composite. Accordingly, the IC50 dose of the ZnO/NSP composite is estimated to be 14.39 ppm, 3.12 ppm and 7.16 ppm for the epidermal cells HaCaT, human fibroblasts and mouse melanoma cells B16F10, respectively.

In addition, according to the OECD TG 439 Skin Irritation Test, a skin and eye irritation test is conducted on the ZnO/NSP composite. The results show that a 20% aqueous solution of the ZnO/NSP composite in purified water does not cause skin and eye irritation, indicated as NI (Non-irritant).

Example 3. Percutaneous Absorption/Microscopic Examination of the ZnO/NSP Composite Percutaneous Absorption Test of the ZnO/NSP Composite (16%)

Reconstructed human epidermis MatTek, EPI-200-SIT (surface area: 0.6 cm$^2$) is used as the source of 3D skin material in this experiment to test the percutaneous absorption of 16% ZnO/NSP composite suspension (called as 16% sample). A subcutaneous fluid (DMEM medium) without the 16% sample is used as the control group. 0.05 mL of the 16% sample is placed on the 3D skin material, and 1.0 mL of culture solution (DMEM medium) is placed subcutaneously. After 6 and 24 hours of percutaneous absorption, the sample is aspirated from the 3D skin and the skin surface is slightly rinsed with culture solution. The subcutaneous culture and the 3D skin are collected and refrigerated. The subcutaneous culture and 3D skin collected from each experimental group are sent to SGS for the determination of content of Si and Zn by ICP/OES method with detection limits: Si: 10 ppm, Zn: 1.0 ppm.

The concentration of ZnO/NSP composite suspension on skin tissue is known to be 16%, i.e., 160,000 ppm, the data listed in table 2 can be calculated by assuming NSP:ZnO (wt. ratio) is 44.8:55.2. The data in Table 2 show that the amount of ZnO/NSP composite entering the subepidermal tissue is very small, and the transdermal rate of passing through the skin is extremely low.

TABLE 2

The concentration and flux of Zn measured subcutaneously after the 6 hours and 24 hours of percutaneous absorption.

| Sample | T0 Zn in subcutaneous liquid | T6 Zn in subcutaneous liquid | T24 Zn in subcutaneous liquid |
|---|---|---|---|
| Epidermis concentration (add concentration) (ppm) | 88320 | 88320 | 88320 |
| Volume of sample on the epidermis (mL) | 0.05 | 0.05 | 0.05 |
| ug count (epidermis) | 4416 | 4416 | 4416 |
| Bottom liquid/epidermis concentration (ppm) | 0 | 0 | 8.51 |
| Volume of subcutaneous liquid (mL) | 1 | 1 | 1 |
| ug count (subcutaneous) | 0 | 0 | 8.51 |
| Subcutaneous ug count/ epidermis ug count (%) | 0 | 0 | 0.1927 |
| Pass Ratio (ug/hr) | 0 | 0 | 0.0080 |
| Flux (ng/cm$^2$/hr) | | | 13.3825 |

3D Skin Percutaneous Absorption Test (Microscopic Examination) of the ZnO/NSP Composite (16%)

The percutaneous absorption of the ZnO/NSP composite particles is further examined by microscopy. After the 6 and 24 hour percutaneous absorption test described above, excess samples on human epidermal tissue are aspirated and washed slightly with DMEM medium. Afterwards, the sample of epidermal tissue is embedded in paraffin wax and stained with H&E and sectioned. The upper layer of the epidermal tissue is observed by light microscopy.

Figure 4A:
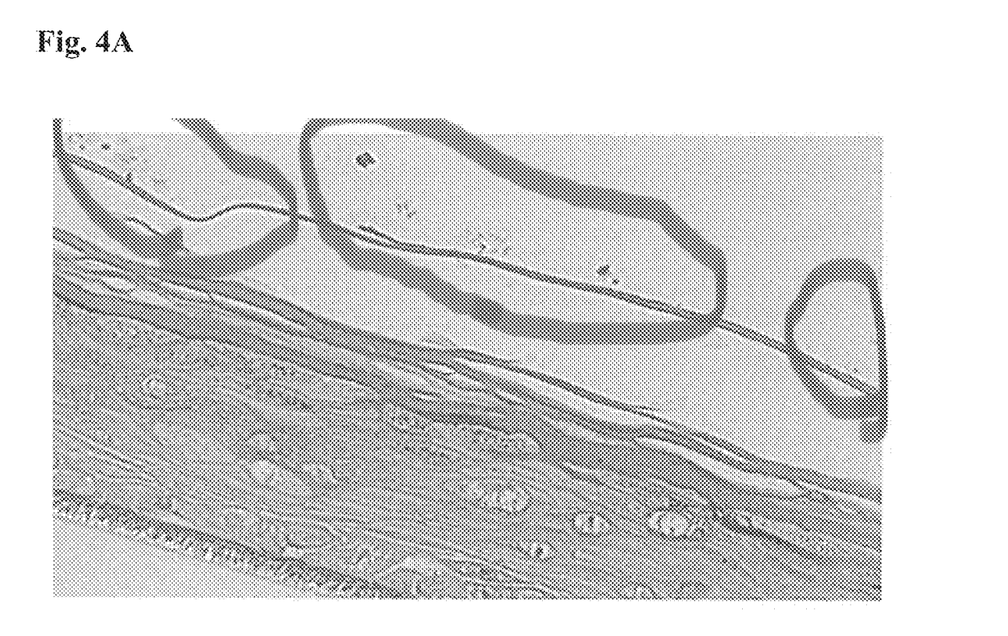
FIG. 4A and FIG. 4B show the results of 3D skin percutaneous absorption test of the ZnO/NSP composite, wherein the epidermal tissue is observed by microscopic 400× magnification. A suspension of 16% (equivalent to $1.6 \times 10^5$ ppm) of the ZnO/NSP composite is applied to the skin, and the distribution of ZnO/NSP particles in the epidermal tissues is observed by microscope after 6 hours (FIG. 4A) and 24 hours (FIG. 4B) of the percutaneous absorption test. The locations of ZnO/NSP particles in each skin layer are indicated by the hand-drawn circles in the figure.
Figure 4B:
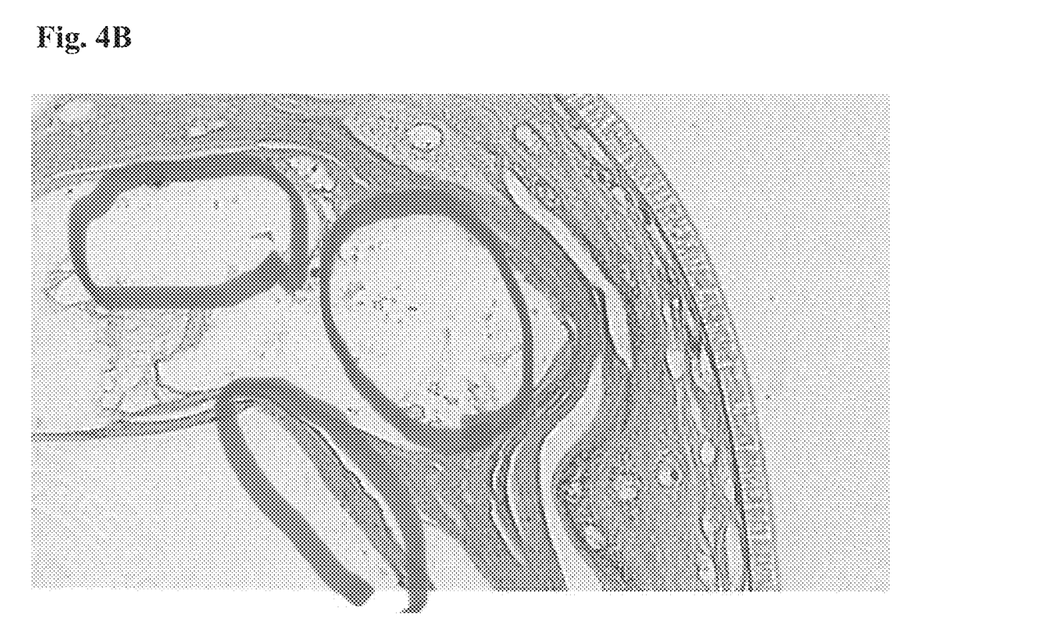

As shown in FIG. 4A-4B, in both the 6-hour and 24-hour groups, the residual particles of ZnO/NSP composite are found in the outer stratum corneum of the skin. In the 24-hour group, the stratum corneum appears to be looser, and the outermost stratum corneum is partially peeled off. However, no obvious ZnO/NSP particles are observed in the inner stratum corneum or granular cells. It is indicated that the amount of ZnO/NSP particles entering the epidermal tissue is very low and almost invisible.

Example 4. Skin Protection Effects of the ZnO/NSP Composite

UV Absorption Capacity

Figure 5:
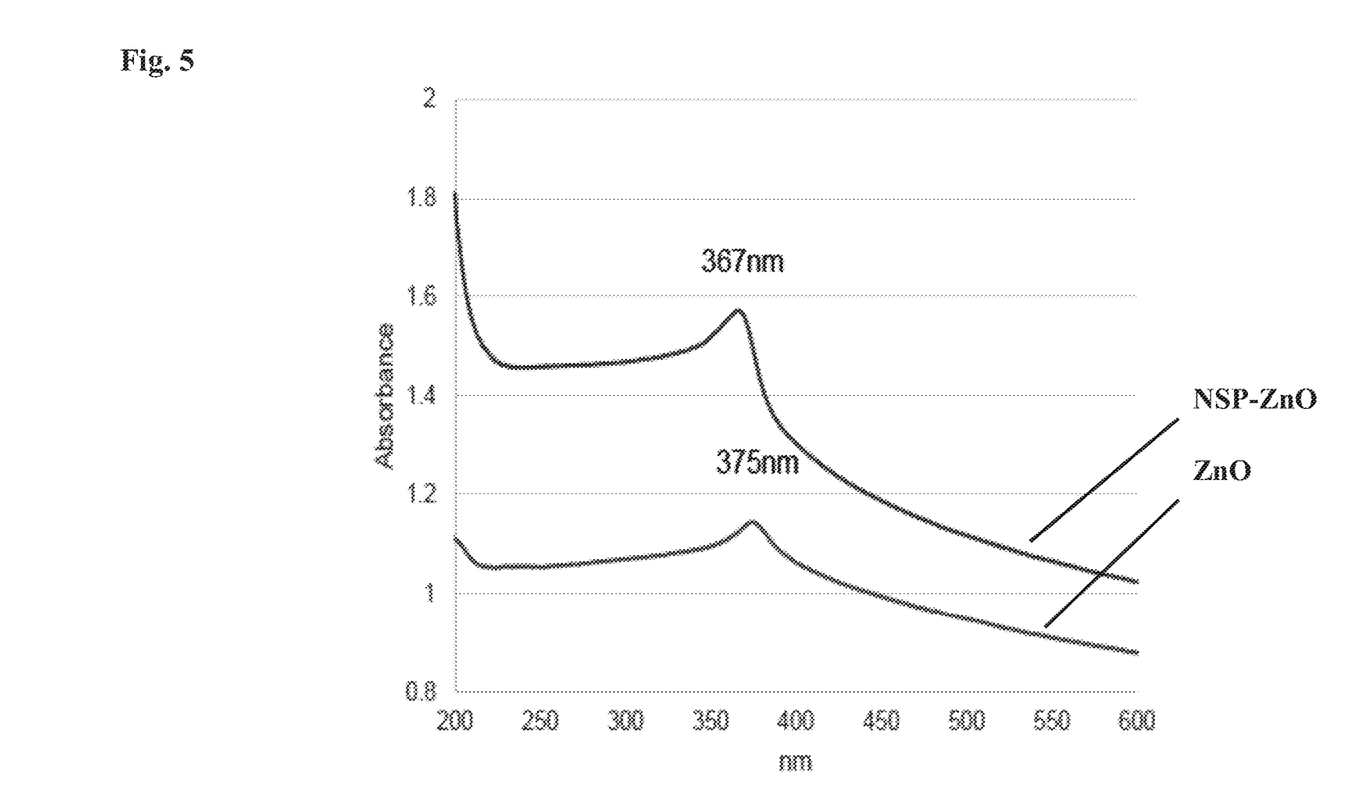
FIG. 5 shows the comparison of the full-spectrum scanning (200 nm to 600 nm) spectra of the ZnO/NSP composite and the commercially available zinc oxide. The maximum absorption of the ZnO/NSP composite appeared at 367 nm, while the maximum absorption of the commercially available zinc oxide appeared at 375 nm, and the ZnO/NSP composite of the present invention exhibits stronger UV absorption.

By comparing the full-spectrum scanning (200-600 nm) spectra of the ZnO/NSP composite and the commercially available zinc oxide in FIG. 5, it is obvious that the ZnO/NSP composite exhibits a stronger UV absorption capability. The maximum absorption of ZnO/NSP composite is at 367 nm, which is shifted to the left compared to the commercially available ZnO (having maximum absorption at 375 nm). This is related to the size of the ZnO particles, and the smaller the size of the particles, the higher the frequency required for the performance of Surface Plasmon Resonance (SPR), and thus the absorption wavelength will decrease. The results suggest that the ZnO particles attached on the ZnO/NSP composite have a significantly smaller particle size than the commercially available ZnO, and have a relatively better ability to absorb UV rays.

Extinction Coefficient (EC) Analysis

Extinction coefficient (EC), also called molar absorption coefficient, is a measure of the intensity of light absorbed by a chemical substance at a specific wavelength. It is an inherent property of a material, and depends on the path length and the concentration of the species, according to the Beer-Lambert law: $A=\varepsilon cl$, where A is the absorbance; $\varepsilon$ is the molar absorption coefficient of that material; c is the molar concentration of those species; and l is the path length. In practice, $\varepsilon$ is usually expressed in terms of $M^{-1} \cdot cm^{-1}$ or $L \cdot mol^{-1} \cdot cm^{-1}$. Another measure of extinction coefficient is $E_{1,1}$ (mass extinction coefficient). $E_{1,1}$ is the absorbance of a 1% solution, expressed in $g-1\ L\ cm^{-1}$. The $\varepsilon$ and $E_{1,1}$ can be converted by using the following equation: $\varepsilon=(E_{1,1}*\text{molecular weight})/10$.

Experimental method: an individual 1.0 mg/mL suspension of the ZnO/NSP composite and commercially available zinc oxide is prepared. The full spectral scanning (200~600 nm) of UV/visible light is performed with a Spectrophotometer, and the extinction coefficients are calculated according to the Beer-Lambert equation. 1.0 mg/ml of the ZnO/NSP composite has a maximum absorbance of 367 nm; and 1.0 mg/ml of the commercially available ZnO has a maximum absorbance of 375 nm.

TABLE 3

|  | Wavelength | Absorbance | $\varepsilon^a$ | $E_{1,1}{}^b$ | $k^c$ |
|---|---|---|---|---|---|
| ZnO/NSP composite | 367 | 1.573 | 113.16 | 15.73 | 105.12 |
| commercial ZnO | 375 | 1.145 | 93.08 | 11.45 | 78.19 |

[a] Calculated by $A = \varepsilon\ cl$, c is the molar concentration (the molecular weight of ZnO-NSP Hybrid is calculated with 55.2% ZnO and 44.8% $SiO_2$).
[b] calculated by $A = \varepsilon\ cl$, where c is the weight percentage concentration.
[c] is calculated by $\alpha = 2.303*A/L$, $\kappa = \alpha\ \lambda/4\pi$.

The higher the extinction coefficient, the better the shading ability. From the data listed in Table 3, it is shown that the ZnO/NSP composite has a higher extinction coefficient than the commercially available ZnO, regardless of which formula is used. In terms of $E_{1,1}$ (mass extinction coefficient), the extinction coefficient of 100% ZnO is increased by about 37% when modified into the ZnO/NSP composite, which may be due to the smaller particle size and better dispersion effects of the zinc oxide particles adsorbed on the silicate platelet. In summary, the above results show that the ZnO/NSP composite can provide better UV protection to the skin than the commercially available ZnO.

Antimicrobial Effects
Determination of the Inhibitory Concentration of the ZnO/NSP Composite Against Pathogenic Microorganism In this example, the antimicrobial effects of the ZnO/NSP composite against five pathogenic microorganism, *Aspergillus brasiliensis* (ATCC 16404), *Staphylococcus aureus* (ATCC 6538), *Escherichia coli* (ATCC 8739), *Candida albicans* (ATCC 10231), and *Pseudomonas aeruginosa* (ATCC 9027), are tested. In the experiment, the microorganism suspension without sample treatment is used as the negative control group, which is expected having no antimicrobial effect; the antibiotic-containing microorganism suspension is used as the positive control group, which is expected having antimicrobial effect; and the medium containing no microorganism suspension is used as the blank control group. The inoculum amount of each group is $10^5$~$10^6$ cfu/mL of the microorganism suspension. After inoculation, the microorganism are incubate at the optimal growth conditions for each species (aerobic bacteria: 35±2.0° C.; yeast: 32±2.0° C.; mold: 25±2.0° C.) at 200 rpm with shaking for 18~72 hours. After incubation, the microorganism culture is inoculate into the culture medium containing the ZnO/NSP composite at the concentration required for the experiment, and then incubated under the optimal growth conditions for each species (aerobic bacteria: 35±2.0° C., 24 hours; yeast: 32±2.0° C., 48 hours; mold: 25±2.0° C., 72~96 hours). The growth condition of microorganism is observed and the minimum inhibitory concentration is recorded.

TABLE 4

The minimum inhibitory concentration of ZnO/NSP composite against *Aspergillus brasiliensis*, *Staphylococcus aureus*, *Escherichia coli*, *Candida albicans* and *Pseudomonas aeruginosa*

| Species | MIC (%) |
|---|---|
| *Escherichia coli* | 9 |
| *Pseudomonas aeruginosa* | 16 |
| *Staphylococcus aureus* | 9 |
| *Candida albicans* | 16 |
| *Aspergillus brasiliensis* | 20 |

In order to confirm the enhancement of antimicrobial effects is actually caused by the ZnO/NSP composite, we will further compare the inhibitory activities of natural silicate platelet (NSP), zinc oxide (ZnO), and the ZnO/NSP composite on the growth of *E. coli*. The solutions of NSP, ZnO, and the ZnO/NSP composite at concentrations of 0, 50, 70, 100, 200, and 500 ppm are incubated with *E. coli* ($1\times10^6$ CFU/mL) for 8 hours (at 37° C., 200 rpm), and then the $OD_{600}$ values of each culture solution are measured. The results are listed in Table 5.

TABLE 5

The antimicrobial activities of natural silicate platelet (NSP), zinc oxide (ZnO), and the ZnO/NSP composite on *E. coli*.

| Sample | [NSP] (ppm) | [ZnO] (ppm) | $AOD_{600}$ |
|---|---|---|---|
| Control | 0 | 0 | 0.596 |
| NSP | 50 | 0 | 0.623 |
|  | 70 | 0 | 0.617 |
|  | 100 | 0 | 0.599 |
|  | 200 | 0 | 0.604 |
|  | 500 | 0 | 0.587 |
| ZnO | 0 | 50 | 0.433 |
|  | 0 | 70 | 0.382 |
|  | 0 | 100 | 0.137 |
|  | 0 | 200 | 0.001 |
|  | 0 | 500 | -0.012 |
| ZnO/NSP | 21.4 | 50 | 0.114 |
|  | 30 | 70 | -0.002 |
|  | 42.9 | 100 | 0.001 |

As shown in the results, simply NSP does not exhibit antimicrobial activity at concentrations below 500 ppm, while ZnO exhibits antimicrobial activity at 200 ppm, and the ZnO/NSP composite exhibits antimicrobial activity at 70 ppm, which indicates that the antimicrobial efficacy of zinc oxide is indeed enhanced by attaching to the silicate platelet.

Determination of the Inhibitory Concentration of the ZnO/NSP Composite Against *Malassezia globosa*

The methodology is based on the method described in Andrews J M., *J Antimicrobio Chemother* 48 suppl 1:5-16, 2001. *Malassezia globosa* (BCRC 23114) is cultured at 30±2° C. in an aerobic environment for 5 days. The number of M. Globosa is adjusted to the desired count of $1.5\times10^8$ CFU/mL. The experimental group and the control group are inoculated with 1% of the M. globosa suspension individually, and the final amount of M. globosa added is $10^4\sim10^5$ CFU/mL. The suspension culture of the control group (without the ZnO/NSP composite, pH 5.40 at 25° C.) is subjected to serial dilution, and the growth condition is observed and recorded during the incubation. The experimental groups are: FS21092401S4 group (prepared from the ZnO/NSP composite powder as 0.1% liquid in culture medium, pH 5.86 at 25° C.); and FS21092402S4 group (prepared from the ZnO/NSP composite liquid as 1% liquid in culture medium, pH 6.18 at 25° C.). After inoculation, the control group and the experimental group are subjected to culture conditions, at 30±2° C.; aerobic environment; for 48 hours. Serial dilution is carried out at the 24th and 48th hours, and the growth conditions are observed and recorded during the incubation. The results are listed in Table 6.

Microorganism Reduction Rate (%) =

$$\frac{\text{(Survival bacteria amount after inoculation in the control group} - \text{Survival bacteria amount after inoculation of experimental group)}}{\text{Survival bacteria amount after inoculation in the control group}} \times 100\%$$

TABLE 6

Results of antifungal test, presented as % reduction (R%)

| Sample No. | Sample concentration | % reduction (R %) after 24 h treatment | % reduction (R %) after 48 h treatment |
|---|---|---|---|
| FS21092401S4 | 0.1% | >99 | >99.99 |
| FS21092402S4 | 1% | >99 | >99.99 |

Figure 6A:
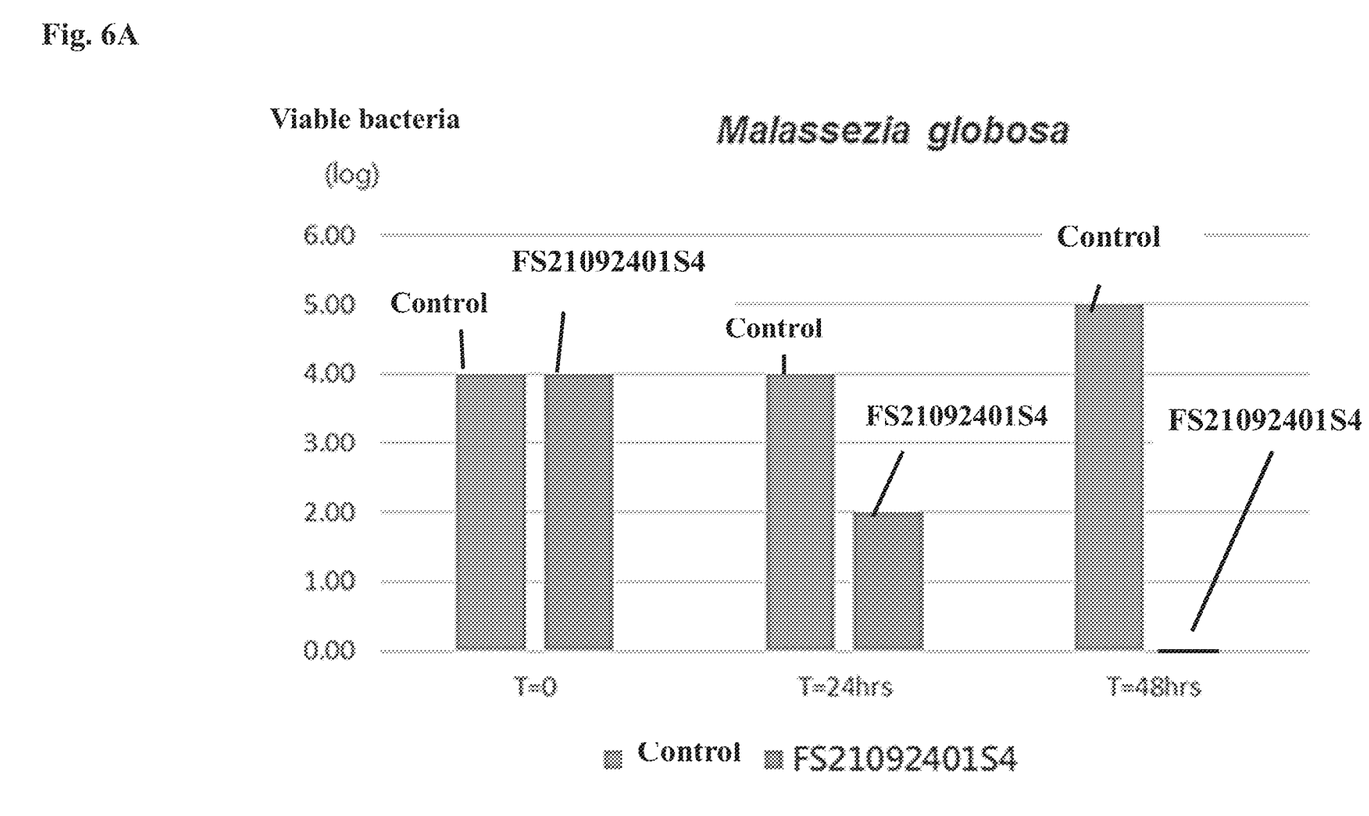
FIG. 6A shows the result of determining the fungal inhibition concentration of *Malassezia globosa* treated in a 0.1% solution of the ZnO/NSP composite (FS21092401S4), which is prepared in culture solution in powder form.
Figure 6B:
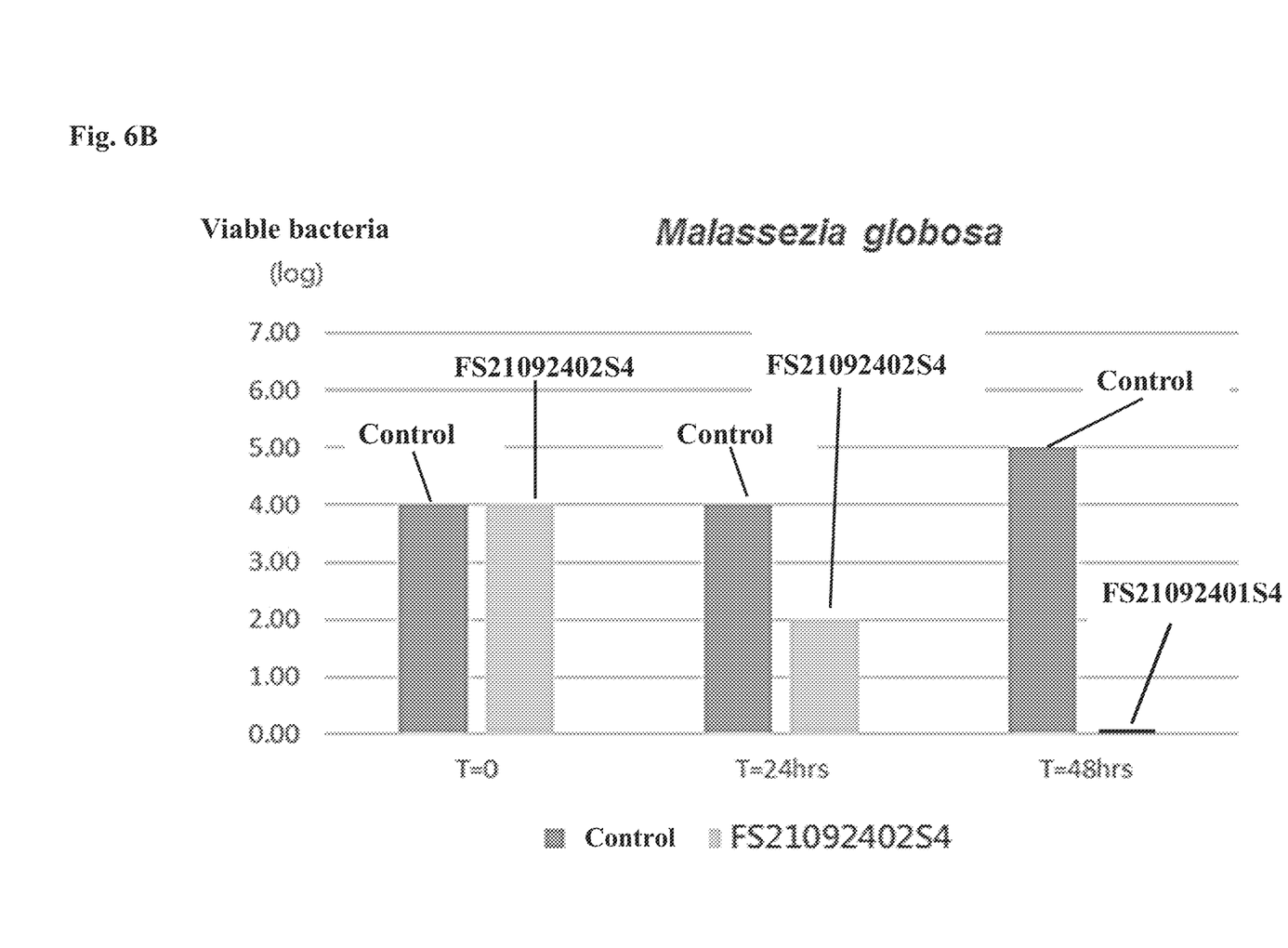
FIG. 6B shows the result of determining the fungal inhibition concentration of *Malassezia globosa* treated in a 1% solution of the ZnO/NSP composite (FS21092402S4), which is prepared in culture solution in liquid form.

The results in FIG. 6 also show that the growth of *Malassezia globosa* is completely inhibited by the ZnO/NSP composite at a concentration of 1,000 ppm, whether it is prepared in a powder or a liquid form.

Example 5. Use of the ZnO/NSP Composite Formulated in Skin Protecting Compositions Sunscreen Emulsions The following table shows an example of a sunscreen emulsion composition (W/O emulsion). According to a conventional emulsion producing process, the ZnO/NSP composite is firstly formulated into the aqueous phase of the further prepared W/O emulsion.

| Item | Components | Content ratio (% wt) |
|---|---|---|
| A | PEG-30 Dipolyhydroxystearate | 2.55 |
|  | Polyglyceryl-4 Isostearate | 1.00 |
|  | Titanium Dioxide | 5.032 |
|  | Aluminum Hydroxide | 0.884 |
|  | Stearic acid | 0.884 |
|  | C12-15 Alkyl Benzoate | 5.00 |
|  | Isononyl Isononanoate | 5.00 |
|  | Isohexadecane | 10.00 |
| B1 | Water | 22.95 |
|  | Glycerin | 5.00 |
|  | Magnesium sulfate | 0.70 |
| B2 | Water | 25.00 |
|  | ZnO/NSP composite | 15.00 |
| C | Propanediol | 0.65 |
|  | 1,2-Hexanediol | 0.30 |
|  | Caprylhydroxamic Acid | 0.05 |
|  | Total | 100.00 |

Item B1 is added to item A in three equal portions, and mix slowly at low homogenizing speed (1000~2000 rpm) to form a emulsion. Item B2 is added slowly to the resulting emulsion, and mix at low homogenizing speed. Finally, the item C is added to the resulting emulsion, mixed well, and homogenized at high speed (4000~5000 rpm) until the consistency is stable.

The following table shows an example of a sunscreen emulsion composition (W/O emulsion). According to a conventional emulsion producing process, the ZnO/NSP composite is firstly formulated into the oil phase of the further prepared W/O emulsion.

| Item | Components | Content ratio (% wt) |
|---|---|---|
| A | PEG-30 Dipolyhydroxystearate | 2.55 |
|  | Polyglyceryl-4 Isostearate | 1.00 |
|  | Titanium Dioxide | 5.032 |
|  | Aluminum Hydroxide | 0.884 |
|  | Stearic acid | 0.884 |
|  | Zinc Oxide (and) Montmorillonite(ZnO-NSP) | 15.00 |
|  | C12-15 Alkyl Benzoate | 5.00 |
|  | Isononyl Isononanoate | 5.00 |
|  | Isohexadecane | 10.00 |
| B | Water | 47.95 |
|  | Glycerin | 5.00 |
|  | Magnesium sulfate | 0.70 |
| C | Propanediol | 0.65 |
|  | 1,2-Hexanediol | 0.30 |
|  | Caprylhydroxamic Acid | 0.05 |
|  | Total | 100.00 |

Item B is added to item A in three equal portions, and mix slowly at low homogenizing speed (1000~2000 rpm) to form a emulsion. Finally, the item C is added to the resulting emulsion, mixed well, and homogenized at high speed (4000~5000 rpm) until the consistency is stable.

In addition, a W/O emulsion containing commercially available ZnO (which is lipophilic) is prepared by formulating ZnO into the oil phase firstly. The resulting emulsions described above are tested for sun protection. The SPF (Sun Protection Factor), UVAP and Star Rating are indicators of UVB and UVA protection respectively. In this example, the PMMA substrates coated with test emulsions are irradiated with UVA (320-400 nm) and UVB (290-320 nm), and the transmitted light is collected by an integrating sphere. The transmission rate of each test emulsion is examined at 1 nm intervals between 290-400 nm, and then converted by the SPF Calculator software of UV-2600 to obtain the values of SPF, UVAP, and Star Rating. The test results are shown in Table 7.

TABLE 7

The results of sunscreen test.

|  | ZnO/NSP composite, formulated into aqueous phase, W/O emulsion | ZnO/NSP composite, formulated into oil phase, W/O emulsion | Commercial ZnO, formulated into oil phase, W/O emulsion |
|---|---|---|---|
| SPF | 51.31 | 40.37 | 45.87 |
| UVA/UVB Ratio | 0.81 | 0.75 | 0.87 |
| UVAPF | 17.70 | 12.95 | 25.57 |
| Star Rating | **** | *** | **** |
| Critical Wavelength (nm) | 371 | 372 | 374 |

The preferable W/O emulsion made from the ZnO/NSP composite is hydrophilic and prepared by firstly dispersing the ZnO/NSP composite in the aqueous phase. In contrast, the W/O emulsion made from commercially available is lipophilic and prepared by firstly dispersing ZnO in the oil phase. The micro-graded ZnO/NSP composite powders are easy to disperse and be manipulated in water, which are not aggregated. The resulting emulsion does not produce white sense when applied to the skin, and has advantages of being non-greasy and refreshing, which is easy to use for cleansing the face and body.

Anti-Dandruff Shampoo

The following table shows an example of an anti-dandruff shampoo composition containing 1% (w/w) of the ZnO/NSP composite.

| Trade Name | % w/w | INCI-Name |
|---|---|---|
| Carbopol Aqua SF-1 Polymer | 3.00 | Acrylates Copolymer |
| Di. Water | 31.47 | Demineralized Water |
| Diapon K-SF | 20.00 | Sodium Methyl Cocoyl Taurate |
| Perlastan SC 25 NKW | 12.00 | Disodium Cococyl Glutamate, Sodium Cocoyl Glutamate |
| NaOH (10%) | 1.68 | Water, Sodium Hydroxide |
| Softilt AS-L | 18.00 | Sodium Lauroyl Methylaminopropionate |
| Unisafe PGML | 2.00 | Propylene Glycol Laurate |
| Sage TK 12440 | 0.30 | Fragrance |
| Aquaguard NK12 | 1.00 | Water, Sodium Benzoate, Potassium Sorbate |
| Natrlquest E30 | 0.30 | Trisodium Ethylenediamine Disuccinate |
| ZnO/NSP composite liquid | 1.00 |  |
| Dehyton K | 5.00 | Cocamidopropyl Betaine |
| Merquat 280 Polymer | 2.00 | Polyquaternium-22 |
| Merquat 2003PR | 1.50 | Polyquaternium-53 |
| Citric Acid (50%) | 0.75 | Citric Acid, Water |
|  | 100% |  |

According to a conventional shampoo producing process, the ZnO/NSP composite is added to the known shampoo formulation with a liquid ZnO content of 4.2% to produce a shampoo product (called as shampoo YH-040) containing 420 ppm ZnO. Another shampoo product (called as shampoo YH-040-1) containing 2% of the ZnO/NSP composite in liquid form is also prepared.

Combining with the experimental results described in the Examples 2 and 3, the ZnO/NSP composite has the inhibitory effects on the *M. globosa* causing dandruff. Compared to the known anti-dandruff product Zinc Pyrithione (ZPT, banned by the European Union from March 2022), the ZnO/NSP composite is non-toxic and suitable for daily use to provide essential nutrients for hair growth and inhibit the growth of scalp microorganisms for maintaining the scalp in a healthy environment.

In conclusion, the ZnO-NSP composite exhibits a hydrophilic property, and the ZnO/NSP composite powder is easily dispersed and manipulated in water and does not aggregate. The resulting composition of ZnO/NSP composite will not create irritation or an unpleasant white sense when applied to the skin, and gives consumers a non-greasy and refreshing feeling. In particular, the ZnO/NSP composite uses silicate platelet as the carrier of zinc oxide particles, which enables zinc oxide particles to be more evenly dispersed and adsorbed on the silicate platelet, thus not only effectively reducing the amount used, but also enhancing the UV absorption ability and antimicrobial efficacy of ZnO. It has been proven that the ZnO/NSP composite is non-toxic to skin cells and has very low penetration into the internal skin tissues. Therefore, the ZnO/NSP composite is safe and effective for use in skin protection compositions, especially the cosmetic compositions for applying to human skin.

Although a limited number of embodiments are described to illustrate the practice of the present invention, those skilled in the art may still make modifications or changes according to the description. Therefore, the scope of the present invention should only be limited by the claims of the patent, and not limited to the above examples.

What is claimed is:

1. A method for skin protection, which comprises applying a ZnO-on-silicate platelet composite (ZnO/NSP composite) to a subject in need thereof.

2. The method of claim 1, wherein the ZnO/NSP composite is produced by adding an aqueous solution of zinc salt to a silicate platelet suspension for metal ion exchange reaction; adding NaOH to form zinc hydroxide on a surface of the silicate platelet; and dehydrating the zinc hydroxide to form zinc oxide particles adsorbed on the surface of the silicate platelet.

3. The method of claim 1, wherein the ZnO/NSP composite is used to protect the skin against UV rays.

4. The method of claim 1, wherein the ZnO/NSP composite is used to protect the skin against microbial infections.

5. The method of claim 4, wherein the microbial infection is caused by a pathogenic microorganism and or a dandruff causing fungi.

6. The method of claim 1, wherein the ZnO/NSP composite is formulated in a cosmetic composition at 0.01%~25% (w/w) by total weight of the composition.

7. The method of claim 6, wherein the cosmetic composition is a sunscreen emulsion.

8. The method of claim 6, wherein the cosmetic composition is an antimicrobial shampoo.

9. The method of claim 6, wherein the cosmetic composition is a hair tonic composition.

* * * * *